United States Patent
Uriel

(10) Patent No.: US 10,079,797 B2
(45) Date of Patent: Sep. 18, 2018

(54) METHODS, SYSTEMS AND APPARATUS TO REMOTELY START A VIRTUAL MACHINE

(71) Applicant: VMware, Inc., Palo Alto, CA (US)

(72) Inventor: Ilan Uriel, Herzliya (IL)

(73) Assignee: VMware, Inc., Palo Alto, CA (US)

( * ) Notice: Subject to any disclaimer, the term of this patent is extended or adjusted under 35 U.S.C. 154(b) by 139 days.

(21) Appl. No.: 14/526,987

(22) Filed: Oct. 29, 2014

(65) Prior Publication Data
US 2016/0127509 A1 May 5, 2016

(51) Int. Cl.
*H04L 29/12* (2006.01)
*G06F 9/455* (2018.01)

(52) U.S. Cl.
CPC ........ *H04L 61/103* (2013.01); *G06F 9/45558* (2013.01); *H04L 61/2015* (2013.01); *G06F 2009/45595* (2013.01)

(58) Field of Classification Search
CPC ... G06F 9/455; H04L 61/103; H04L 61/2015; H04L 67/40; H04L 67/42
See application file for complete search history.

(56) References Cited

U.S. PATENT DOCUMENTS

| | | | |
|---|---|---|---|
| 8,880,687 B1 * | 11/2014 | Chandrachari | H04L 43/065 709/224 |
| 2004/0064520 A1 * | 4/2004 | Takahashi | H04L 29/12273 709/208 |
| 2004/0128375 A1 | 7/2004 | Rockwell | |
| 2004/0128669 A1 | 7/2004 | Furst et al. | |
| 2006/0020848 A1 | 1/2006 | Maity et al. | |
| 2009/0015433 A1 | 1/2009 | James et al. | |
| 2009/0217021 A1 * | 8/2009 | Goodson | G06F 9/45558 713/1 |
| 2010/0076604 A1 | 3/2010 | Johnson et al. | |
| 2010/0205304 A1 * | 8/2010 | Chaturvedi | H04L 61/2015 709/226 |
| 2010/0251234 A1 * | 9/2010 | Oshins | G06F 9/5077 718/1 |

(Continued)

OTHER PUBLICATIONS

Real Time Logic, "Application Server versus Web Server," barracudaserver.com, Jul. 29, 2014, 2 pages.

*Primary Examiner* — Arvin Eskandarnia
*Assistant Examiner* — Gil H. Lee
(74) *Attorney, Agent, or Firm* — Hanley, Flight and Zimmerman, LLC

(57) ABSTRACT

Methods and apparatus to remotely start a virtual machine are disclosed herein. An example method to remotely start a virtual machine includes requesting, at a network device, allocation of a network address to the network device, the network address formerly being allocated to the virtual machine and generating, with the network device, a user interface. The user interface presents an option to start at least one of the virtual machine and an operating system installed in the virtual machine. Some example methods also include requesting, at the network device, release of the network address based on a selection of the option to start the virtual machine. Release of the network address causes the network address to be available for re-allocation to the virtual machine. The example methods can further include generating an instruction to start the virtual machine when the option to start the virtual machine is selected.

18 Claims, 6 Drawing Sheets

(56) References Cited

U.S. PATENT DOCUMENTS

| | | | |
|---|---|---|---|
| 2011/0022695 A1* | 1/2011 | Dalal | G06F 9/5077 709/222 |
| 2012/0030670 A1* | 2/2012 | Vijay | G06F 9/45558 718/1 |
| 2012/0124580 A1* | 5/2012 | Bouchier | G06F 9/4843 718/1 |
| 2013/0239108 A1* | 9/2013 | Lee | G06F 9/45558 718/1 |
| 2014/0047081 A1 | 2/2014 | Edwards | |
| 2014/0137112 A1* | 5/2014 | Rigolet | G06F 9/45558 718/1 |
| 2016/0241702 A1* | 8/2016 | Gorajala Chandra | H04M 1/72533 |

\* cited by examiner

US 10,079,797 B2

METHODS, SYSTEMS AND APPARATUS TO REMOTELY START A VIRTUAL MACHINE

FIELD OF THE DISCLOSURE

This disclosure relates generally to virtual machines and, more particularly, to remotely starting a virtual machine.

BACKGROUND

Virtual machines are typically coupled to, or otherwise in communication with, remote sites via a network. A user operating a monitor and a keyboard (or other user interface device) situated at the remote site gains access to the virtual machine via the network connection. When the virtual machine shuts down, crashes or suffers a major failure, it also stops communicating via the network and any attempt to communicate with the virtual machine will be unsuccessful, and usually terminate with a network timeout message. Restarting the virtual machine requires access to a management system which communicates with a hypervisor associated with the inoperable virtual machine. However, access to the management system is typically restricted to a system administrator(s) for security reasons, thus leaving the individual user of a specific virtual machine, incapable of booting his virtual machine on his own.

Figure 1:
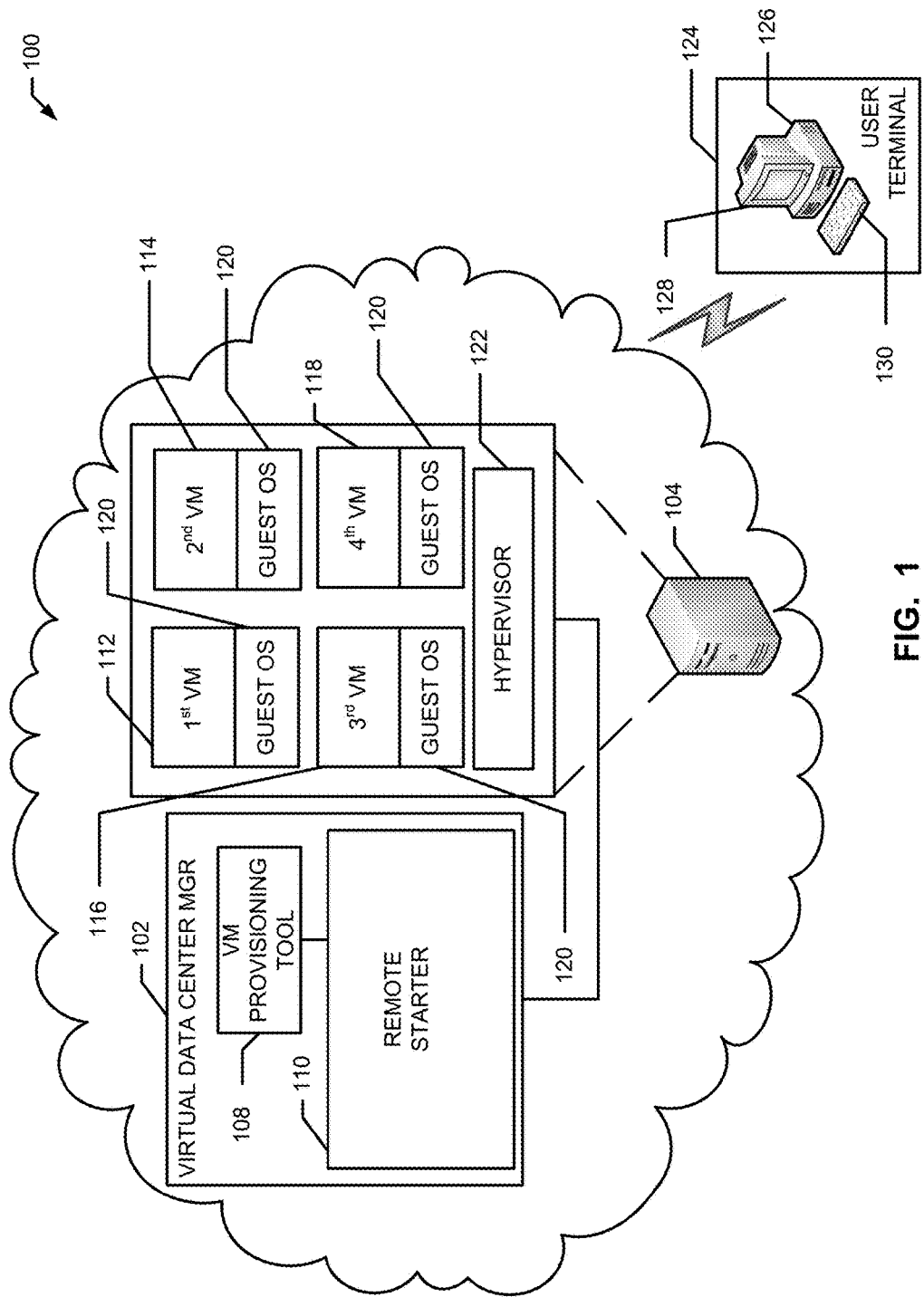
FIG. 1 is a block diagram of an example virtual data center manager having an example remote starter and an example virtual machine provisioning tool for use in remotely starting an example virtual machine(s) operable via an example user site.

Wherever possible, the same reference numbers will be used throughout the drawing(s) and accompanying written description to refer to the same or like parts. As used herein, the phrase "in communication," including variances thereof, encompasses direct communication and/or indirect communication through one or more intermediary components and does not require direct physical (e.g., wired) communication and/or constant communication, but rather additionally includes selective communication at periodic or aperiodic intervals, as well as one-time events.

DETAILED DESCRIPTION

Methods, systems and apparatus to remotely start a virtual machine are disclosed herein. Example methods to start a virtual machine include requesting, at a network device, allocation of a network address to the network device. The network address requested was formerly allocated to the virtual machine. Example methods also include generating, with the network device, a user interface that presents an option to start at least one of 1) the virtual machine and 2) an operating system installed in the virtual machine. Further methods include requesting, at the network device, release of the network address based on a selection of the option to start the virtual machine. Release of the network address causes the network address to be available for re-allocation to the virtual machine. Example methods can further include generating an instruction to start the virtual machine when the option to start the virtual machine is selected. In some such examples, release of the network address is requested before the virtual machine is started.

Some methods additionally include determining, at the network device, whether the virtual machine is non-responsive and requested allocation of the network address when the virtual machine is determined to be non-responsive. When the virtual machine is determined to be non-responsive, some methods also include determining whether the network address is still allocated to the virtual machine and, if the network address is still allocated to the virtual machine, causing the network address to be released from allocation to the virtual machine. Some additional methods further include identifying a starter module assigned to start the virtual machine, and notifying the starter module when the virtual machine is determined to be non-responsive. In some examples, requesting allocation of the network address to the network device comprises sending a request from the network device to a DHCP server. In some examples, generating the instruction to start the virtual machine includes sending an instruction to a hypervisor associated with the virtual machine. In some such examples, the hypervisor responds to the instruction by starting the virtual machine.

Also disclosed herein is a tangible machine readable medium storing instructions which, when executed, cause a machine to request that a network address formerly assigned to a virtual machine be assigned to a virtual machine starter, and also cause the machine to generate a user interface at the virtual machine starter. The user interface presents an option to start the virtual machine. Some instructions, when executed, further cause the machine to request the network address be released from assignment to the virtual machine starter based on a selection of the option to start the virtual machine. In some examples, the instructions, when executed, further cause the machine to start the virtual machine when the option to start the virtual machine is selected. In some examples, the instruction to start the virtual machine includes an instruction to reboot a guest operating system installed in the virtual machine.

In some examples, the instructions, when executed, cause the machine to determine whether the virtual machine is non-responsive. In some such examples, assignment of the network address is requested when the virtual machine is determined to be non-responsive. Additional instructions, when executed, cause the machine to determine whether the network address is still allocated to the virtual machine. If the network address is still allocated to the virtual machine, the instructions cause the network address to be released from allocation to the virtual machine. In some examples, the request for assignment of the network address is sent to a dynamic host configuration protocol server.

An example apparatus to start a virtual machine is also disclosed herein. In some examples, the apparatus includes an identity requestor to request assignment of an IP address formerly assigned to the virtual machine, a user interface generator to generate a user interface presenting an option to start the virtual machine, and an identity releaser to release the IP address based on start of the virtual machine. In some examples, the identity releaser is further to release the IP address from assignment to the virtual machine, if the request for assignment of the IP address is denied.

In some examples, the apparatus includes a starter module to cause the virtual machine to start based on selection of the option to start the virtual machine. In some examples, the starter module generates a start instruction for transmission to a hypervisor associated with the virtual machine. An example apparatus also includes a monitor to determine whether the virtual machine is non-responsive. In some examples, the identity requestor requests assignment of the IP address when the virtual machine is determined to be non-responsive. In some examples, the virtual machine is a first virtual machine of a plurality of virtual machines, the IP address is a first IP address of a plurality of IP addresses, and the monitor is to monitor the responsiveness of the plurality of virtual machines. In some such examples, the apparatus further includes a starter manager to transmit information identifying the first IP address to the identity requestor based on a determination by the monitor that the operational status of the first virtual machine is non-responsive. Each of the plurality of virtual machines is assigned a respective IP address and the apparatus further includes a data storage to store information identifying the virtual machines and respective IP addresses. In some examples, the starter manager accesses the data storage to identify a respective one of the IP addresses assigned to one of the plurality of virtual machines that the monitor has determined to be non-responsive.

Virtual machines installed in cloud computing environments are accessible to remote users via a network connection. On occasion, a virtual machine and/or a guest operating system installed on the virtual machine may be inadvertently turned off due to operator error, a power failure, a software malfunction, etc. However, due to the virtual nature of the virtual machine, there is no hardware switch that the user can operate to start the virtual machine when the virtual machine becomes inoperable, (e.g., is turned off, becomes non-responsive, etc.). Likewise, due to the remote nature of the hardware used to implement the virtual machine, the user is unable to locally start/re-start the virtual machine. With no mechanism to start the virtual machine, the user must wait for a timeout period to elapse before a virtual data center manager automatically starts the virtual machine. Alternatively, the user must contact a virtual data center administrator to start the virtual machine. Thus, for the duration of the timeout period, or until the virtual data center administrator can lend assistance, the virtual machine is inoperable, thereby resulting in wasted downtime. In some instances, the user may prefer to intentionally shut down the virtual machine to preserve processing resources but may be reluctant to do so without the ability to turn the virtual machine back on at-will. Further, although the automatic start/re-start of a virtual machine based on a timer can be useful, in some instances, a user may wish to shut down a virtual machine and keep it turned off until a later time to preserve processing resources. However, the automatic start of the virtual machine based on a timer removes the ability of the user to keep the virtual machine turned off until a desired time when the processing resources are needed. Thus, the user has limited ability to control the consumption of processing resources.

Example methods, apparatus, systems and articles of manufacture described herein address the inaccessibility of a virtual machine that has become non-responsive by using a remote starter to start the virtual machine. The remote starter takes the identity of the non-responsive virtual machine by requesting, from a DHCP server, an IP address formerly assigned to the virtual machine. To avoid IP address conflicts, the remote starter monitors the operational status of the virtual machine to determine when the virtual machine becomes non-responsive and has, by default, released the IP address. Once the virtual machine is determined to be non-responsive, the remote starter generates a request for assignment/allocation of the IP address formerly assigned to the virtual machine. The DHCP server responds to the request by assigning the IP address to the remote starter. Thereafter, when a user attempts to access the virtual machine via the IP address assigned to the remote starter (previously assigned to the virtual machine), the user instead accesses a web page generated by the remote starter. The web page generated by the remote starter presents the user with an option to start the virtual machine. When the user selects the start option, the remote starter sends an instruction to a hypervisor associated with the virtual machine. The hypervisor responds to the instruction by starting the virtual machine. In addition to sending the instruction to the hypervisor, the remote starter tool releases the IP address for reassignment/reallocation to the virtual machine. In some examples, the remote starter tool releases the IP address by sending a release command to the DHCP server. The started virtual machine can then request assignment/allocation of the IP address from the DHCP server or the hypervisor can request that the IP address be assigned/allocated to the started virtual machine.

The virtual machine can become non-responsive when the virtual machine has been shut down, a guest operating system installed in the virtual machine has been shut down, the guest operating system installed in the virtual machine has stalled due to a software error, etc. Upon the occurrence of at least some of these events, a virtual machine (and/or the associated hypervisor) is typically configured to automatically release the IP address formerly allocated to the virtual machine. In some instances, the virtual machine may fail to release the IP address properly. When this occurs, the request generated by the remote starter for allocation of the IP address will be denied. In some examples, when the IP address request is denied, the remote starter is configured to cause the release of the IP address. In some such examples, the remote starter sends a message to the DHCP server and/or to hypervisor associated with the virtual machine. The DHCP server and/or hypervisor respond to the message by releasing the IP address from assignment to the virtual machine, thereby leaving the IP address available for allocation to the remote starter.

In some examples, a remote starter provides an option to start a single virtual machine. In some examples, a remote starter is configured to provide start functionality to multiple virtual machines. In some examples, the monitoring operations are performed by a starter manager that includes a data storage storing information about multiple virtual machines and their associated IP addresses. When the monitoring performed by the starter manager determines that one of the virtual machines has turned off or otherwise become non-responsive, the starter manager consults the data storage to identify the IP address for the virtual machine and transmits the identified IP address to a starter module. The starter module assumes the identity of the virtual machine by utilizing the IP address formerly assigned to the virtual machine and presents a menu that includes a start option to a user who accesses the IP address.

When the start option is selected by the user, the starter module releases the IP address and causes the virtual machine to start. Thus, the methods, apparatus, systems and articles of manufacture described herein permit the remote start of a virtual machine without need to wait for a timeout period to expire and without need to contact a virtual data center administrator.

FIG. 1 is a block diagram of an example virtual computing environment 100 having an example virtual data center manager 102 coupled to, or otherwise in communication with, an example hardware processor 104 via an example communication network 106. In the illustrated example, the virtual data center manager 102 includes an example virtual machine ("VM") provisioning tool 108 and an example remote starter 110. The VM provisioning tool 108 operates to provision a set of example virtual machines ("VM(s)") (e.g., an example first VM 112, an example second VM 114, an example third VM 116, and an example fourth VM 118) on which example guest operating systems 120 are installed. The VM provisioning tool 108 additionally configures the first VM 112, the second VM 114, the third VM 116, and the fourth VM 118 to operate under the control of an example hypervisor 122 implemented on the processor hardware 104. In some examples, during the provisioning operation, one or more of the first VM 112, the second VM 114, the third VM 116, and/or the fourth VM 118 are configured to include remote start functionality as described further below. In some examples, an example remote user terminal 124 includes an example computer 126, an example monitor 128, and an example keyboard 130 by which a user can access any of the first VM 112, the second VM 114, the third VM 116, and/or the fourth VM 118, and by which the user can opt to start any of the first VM 112, the second VM 114, the third VM 116, and/or the fourth VM 118 that have been provisioned with (configured to include) remote start functionality, as is also described further below.

Figure 2:
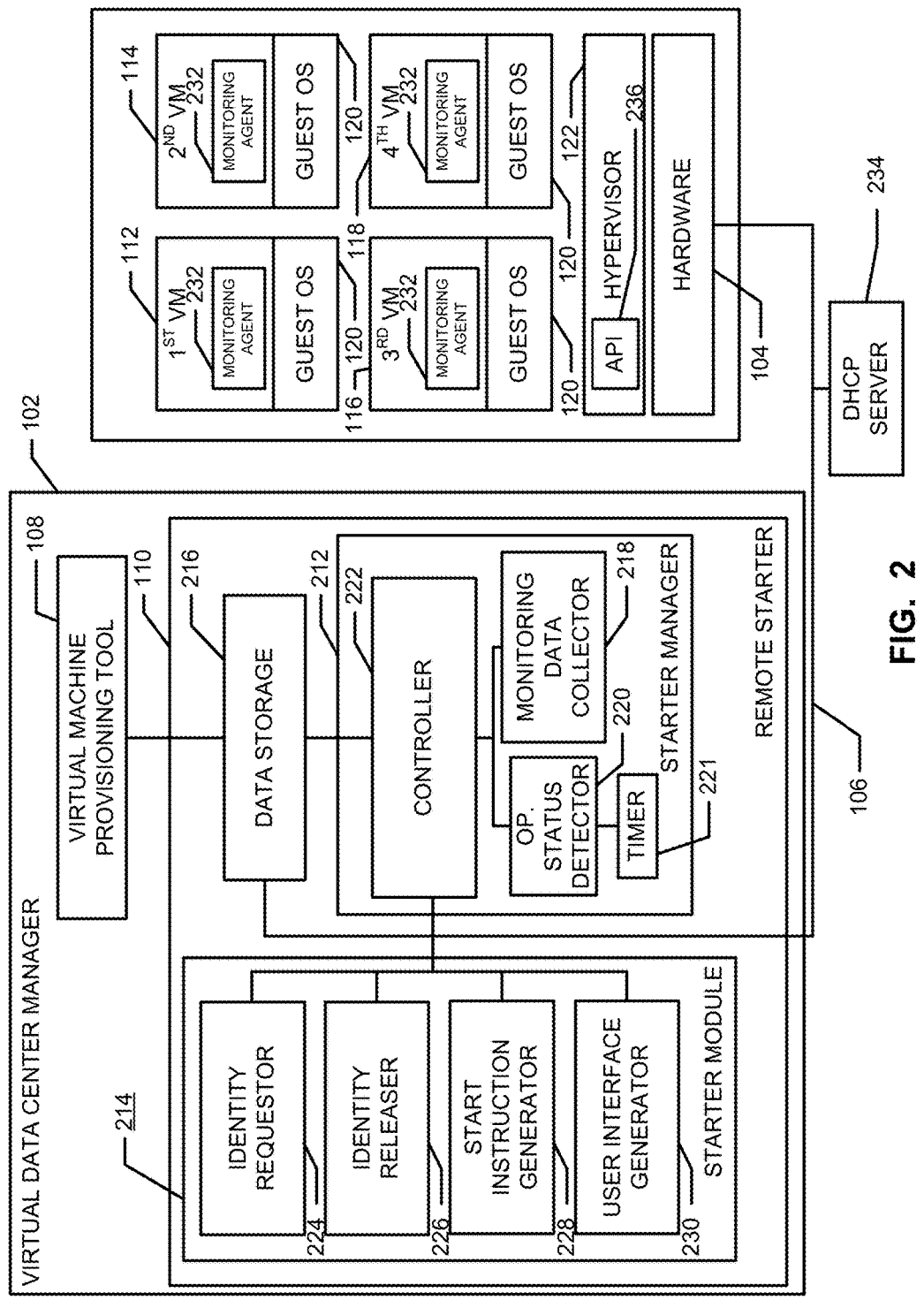
FIG. 2 is a block diagram of an example implementation of the example remote starter, the example virtual machine provisioning tool, and the example virtual machine(s) of FIG. 1.

The block diagram of FIG. 2 illustrates an example implementation of the example remote starter 110 and the example VM provisioning tool 108 of FIG. 1. In the illustrated example of FIG. 2, the remote starter 110 includes an example starter manager 212 coupled to an example starter module 214 and further coupled to a data storage 216. The starter manager 212 includes an example monitoring data collector 218, an example operational status detector 220, an example timer 221, and an example controller 222. In the illustrated example, the starter module 214 includes an example identity requestor 224, an example identity releaser 226, an example start instruction generator 228, and an example user interface generator 230.

When provisioning the virtual machines (e.g., the first VM 112, the second VM 114, the third VM 116, and/or the fourth VM 118) with the example VM provisioning tool 108 (or at any other time), a virtual data center administrator can opt to configure any of the example virtual machines (e.g., the first VM 112, the second VM 114, the third VM 116, and/or the fourth VM 118) to include remote start functionality. When such start functionality is selected for any of the virtual machines, the VM provisioning tool 108 stores information that uniquely identifies each of the selected virtual machines, (e.g., virtual machine identifiers "VM ID(s)"), in the data storage 216. The VM provisioning tool 108 also stores a unique network address (e.g., an IP address) assigned to each selected virtual machine in the data storage 216 along with the respective virtual machine identifying information (e.g., the VM ID). Thus, if the first VM 112 is selected to be configured with remote start functionality, the VM provisioning tool 108 causes an IP address assigned to the first VM 112, referred to as IP address1 to be stored in association with the VM ID that corresponds to the first VM (e.g., "VM ID1"). In some examples, if an IP address has not yet been assigned to one or more of the selected virtual machine(s) (e.g., the first VM 112), the VM provisioning tool 108 may collect and store the corresponding IP address (e.g., IP address1) at a later time and/or may instruct the selected virtual machine(s) (e.g., the first VM 112), to supply the corresponding IP address (e.g., IP address1) to the data storage 216 at a later time (e.g., when such IP address is assigned).

In some examples, when a virtual machine identifier (e.g., "VM ID1") and a corresponding unique network address (e.g., IP address1) are stored in the example data storage 216, the example controller 222 causes the example monitoring data collector 218 to begin collecting monitoring data from the example virtual machine (e.g., the first VM 112) corresponding to the stored VM ID (e.g., VM ID1). In some examples, the monitoring data collector 218 collects the monitoring data from an example monitoring agent 232 associated with the example virtual machine (e.g., the first VM 112). In some examples, the example monitoring agent 232 is implemented using a software monitoring agent. Such software monitoring agents are typically installed on each virtual machine associated with a virtual data center. Each of the software monitoring agents 232 is configured to monitor the performance of the corresponding virtual machine and to report performance information to the virtual data center manager 102. The virtual data center manager 102 uses such performance information to monitor the health of the virtual machines so that corrective action can be taken if the performance of one or more of the virtual machines begins to degrade and/or one or more of the virtual machines is shutdown or becomes non-responsive. In some examples, a virtual machine heartbeat generated by the software monitoring agent 232 can be collected by the monitoring data collector 218. In some such examples, the discontinuation of a heartbeat signal provides an indication that the corresponding virtual machine has stopped operating or is otherwise non-responsive (e.g., has turned off/shutdown and/or stalled).

The example monitoring data collector 218 supplies the collected monitoring data to the example operational status detector 220 which uses the information to determine whether the example virtual machine (e.g., the first VM 112) is operational or has become non-responsive. Upon determining that the example virtual machine (e.g., the first VM 112) has become non-responsive (e.g., has turned off), the operational status detector 220 notifies the example controller 222 that the virtual machine (e.g., the first VM 112) is non-responsive and supplies the corresponding virtual machine identifier (e.g., VM ID1) to the controller 222. The virtual machine (e.g., the first VM 112) may become non-responsive for a variety of reasons including: 1) shut down of the virtual machine, 2) shut down of the guest operating system 120 installed in the virtual machine, 3) a stall condition of the guest operating system 120 installed in the virtual machine, 4) a malfunction of the virtual machine, etc.

The controller 222 responds by accessing the data storage 216 to determine the IP address (e.g., IP address1) corresponding to the virtual machine (e.g., the first VM 112) and the identity of the example hypervisor 122 (e.g., hypervisor ID) corresponding to the virtual machine (e.g., the first VM 112). The controller 222 then supplies the IP address (e.g., IP address1), the virtual machine identifier (e.g., VM ID1), and information identifying the hypervisor (e.g., the hypervisor ID) to the example identity requestor 224.

The example identity requestor 224 of FIG. 2 responds to the information received from the controller 222 by sending a request message to an example DHCP server 234 coupled to the example virtual data center manager 102 and also coupled to the example virtual machine (e.g., the first VM 112). The request message includes a request that the IP address (e.g., IP address1) formerly assigned to the virtual machine (e.g., the first VM 112) be assigned to the example remote starter 110. The DHCP server 234 responds to the request by assigning the IP address (e.g., IP address1) to the starter module 214 and, in some examples, the DHCP server 234 also sends a message to the identity requestor 224 confirming that the address assignment operation is complete.

In some examples, the network address assignment capabilities performed by the example DHCP server 234 are performed by any other network routing device responsible for assigning and/or tracking assignment of IP addresses such as, for example, a network router, hub, switch, etc. In some examples, the example starter manager 212 is implemented as a network device/element that is separately addressable from the starter module 214 and the example data storage 216. In some examples, the request message requests that the IP address of the non-responsive virtual machine be assigned to the starter module 214. In some examples, a network routing device uses network address translation to assign an IP address (e.g., IP address1) (or other network address) that was formerly assigned to the virtual machine (e.g., the first VM 112) to the starter module 214. The network routing device assigns the IP address (e.g., IP address1) to the starter module 214 by causing the IP address (e.g., IP address1) to be placed in a network address translation table (also called a map) in which it the IP address is mapped to a network address associated with the starter module. Thereafter, when communications addressed to the IP address (e.g., IP address1) are routed via the example network, the router, hub, switch, etc., uses the network address translation table to cause the communication to be transmitted to the starter module 214. Thus, the destination address of the communication is changed while in transit.

After receiving confirmation that the IP address (e.g., IP address1) has been assigned to the example starter module 214, the example user interface generator 230 causes a web page (or other user interface) to be displayed to users who access the IP address (e.g., IP address1) via, for example, the example user terminal 124 (see FIG. 1). In some examples, the user interface generator 230 generates the web page before the IP address (e.g., IP address1) has been assigned to the starter module 214, but the web page is not accessible at the IP address (e.g., IP address1) until the IP address (e.g., IP address1) has been assigned to the starter module 214. In some examples, the user interface generator 230 is implemented as an embedded web server that uses HTML to generate a user interface that is displayed to users who access the IP address (e.g., IP address1). In some examples, the user interface generator 230 and/or the starter module are implemented using a low footprint virtual machine. The reassignment of the IP address (e.g., IP address1) from the virtual machine (e.g., the first VM 112) to the user-interface generator 230 of the illustrated example is not transparent to the user such that the user is not aware that the web page displayed at the IP address (e.g., IP address1) is not generated by the virtual machine (e.g., the first VM 112).

The user interface (e.g., web page) generated by the example user interface generator 230 includes an option to start/reboot the virtual machine (e.g., the first VM 112) and may further include a message indicating that the virtual machine (e.g., the first VM 112) has been turned off or otherwise become non-responsive. In some examples, the user selects the option to start the virtual machine (e.g., the first VM 112) by, for example, using the example keyboard 130 (and/or a mouse) to select a graphical display button (e.g., a radial button), click on a link, select an option on a pull down menu, etc. When the option to start the virtual machine (e.g., the first VM 112) is selected, the user interface generator 230 causes the example start instruction generator 228 to generate a start instruction and to transmit the start instruction to the hypervisor 122 associated with the virtual machine (e.g., the first VM 112). In some examples, the start instruction generator 228 obtains information identifying the hypervisor 122 associated with the virtual machine (e.g., the first VM 112) from the example controller 222. In some examples, as described above, the controller 222 sends information identifying the hypervisor 122 to the start instruction generator 228 when the controller 222 transmits the virtual machine identifier (e.g., VM ID1) and the IP address (e.g., IP address1) to the example identity requestor 224. In some examples, one or more of the blocks of the example starter module 214 can access the data storage 216. In some examples, the hypervisor 122 includes an example application programming interface ("API") 236 that responds to the start instruction by starting the virtual machine (e.g., the first VM 112). Application programming interfaces that execute virtual machine start/start instructions are typically associated with hypervisors and provide system administrators a way to re-start/start virtual machines that have been turned off.

As described above, the virtual machine may become non-responsive because 1) the virtual machine has been shut down, 2) the example guest operating system 120 installed in the virtual machine has been shut down, 3) the guest operating system 120 installed in the virtual machine has stalled, 4) the virtual machine has malfunctioned, etc. Thus, when the user selects the option to start the virtual machine, any number of actions may occur based on which of the above-identified issues caused the virtual machine to be become non-responsive. For example, if the virtual machine is still turned on, but the virtual machine is non-responsive, then selecting the option to start the virtual machine may cause the guest operating system to reboot/turn on. If instead, the virtual machine is non-responsive because the virtual machine itself has turned off, then selecting the option to start the virtual machine may cause the virtual machine to turn on and the guest operating system to reboot (or start up).

Upon sending the start instruction to the example hypervisor 122, the example start instruction generator 228 causes the example identity releaser 226 to release the IP address (e.g., IP address1). In some examples, the identity releaser 226 releases the IP address (e.g., IP address 1) by sending a message to the example DHCP server 234 indicating that the IP address (e.g., IP address 1) is being released. In some examples, the identity releaser 226 releases the IP address (e.g., IP address1) by sending a message to the example hypervisor which responds by causing the IP address (e.g., IP address1) to be released. As a result of the release of the IP address (e.g., IP address 1), the IP address (e.g., IP address 1) is available when the example virtual machine (e.g., the first VM 112) subsequently requests assignment of the IP address (e.g., IP address 1). In some examples, upon releasing the IP address (e.g., IP address 1), the identity releaser 226 sends a notice to the example controller 222 of the starter manager 212 indicating that monitoring operations are to resume with respect to the virtual machine (e.g., the first VM 112). In some examples, upon start, the virtual machine (e.g., the first VM 112) sends a notice to the controller 222 indicating that monitoring operations are to resume. In response to the notice, the controller 222 causes the example monitoring data collector 218 to resume the collection of monitoring data from the virtual machine (e.g., the first VM 112).

In some examples, when the example identity releaser 226 releases the IP address (e.g., IP address1), the identity releaser 226 also sends a message to the virtual machine (e.g., the first VM 112), instructing the virtual machine (e.g., the first VM 112) to request the IP address (e.g., IP address1). In some examples, the identity releaser 226 sends a message to the hypervisor 122 instructing the hypervisor 122 to request that the IP address (e.g., IP address1) be assigned to the virtual machine (e.g., the first VM 112). In some examples, when configuring the virtual machine (e.g., the first VM 112) to include remote start functionality, the example VM provisioning tool 108 programs (or otherwise configures) the virtual machine (e.g., the first VM 112) to, after a start operation, request the same IP address that was assigned/allocated to the virtual machine before the virtual machine was shutdown.

Although in the illustrated example of FIG. 2, the example remote starter 110 is shown as part of the example virtual data center manager 102, the remote starter 110 need not be implemented as part of the virtual data center manager 102. For example, the remote starter can be implemented separately from the virtual data center manager 102. In some examples, portions of the remote starter can be implemented in the virtual data center manager 102 while other portions of the remote starter need not be implemented as part of the virtual data center manager 102. Likewise, although, in the illustrated example, the remote starter 110 is configured to respond to the VM provisioning tool 108, the remote starter 110 may be configured to provide remote start functionality to any of the virtual machines independently of the VM provisioning tool 108.

In some examples, the example API 236 in the example hypervisor 122 may be used to detect the health of the example first VM 112 (and any of the example second VM 114, the example third VM 114 and the example fourth VM 116). In some such examples, the API 236 is configured to perform a "live check" to determine whether a virtual machine (e.g., the example first VM 112) is responsive (e.g., functioning properly). If, based on a "live check" the API 236 determines that the first VM 112 is non-responsive, the API 236 generates a start event. The start event causes the example controller 222 to supply the IP address (e.g., IP address1), the virtual machine identifier (e.g., VM ID1), and information identifying the hypervisor (e.g., the hypervisor ID) to the example identity requestor 224. The identity requestor 224 of FIG. 2 responds to the information received from the controller 222 by requesting assignment/allocation of the IP address1, as described above.

While example manners of implementing the example system of FIG. 1 have been illustrated in FIG. 2 one or more of the elements, processes and/or devices illustrated in FIG. 1 and FIG. 2 can be combined, divided, re-arranged, omitted, eliminated and/or implemented in any other way. Further, any of the example starter manager 212, the example starter module 214, the example controller 222, the example data storage 216, the example operational status detector 220, the example timer 221, the example monitoring data collector 218, the example identity requestor 224, the example identity releaser 226, the example start instruction generator 228, and/or, more generally, the example remote starter 110, the example VM provisioning tool 108, the example DHCP server 234, the example virtual machines 112-118, and the example hypervisor 122 may be implemented by hardware, software, firmware and/or any combination of hardware, software and/or firmware. Thus, for example, any of the example starter manager 212, the example starter module 214, the example controller 222, the example data storage 216, the example operational status detector 220, the example monitoring data collector 218, the example identity requestor, the example identity releaser 226, the example start instruction generator 228 and/or, more generally, the example remote starter 110, the example VM provisioning tool 108, the example DHCP server 234, the example virtual machines 112-118, and the example hypervisor 122 could be implemented by one or more circuit(s), programmable processor(s), application specific integrated circuit(s) (ASIC(s)), programmable logic device(s) (PLD(s)) and/or field programmable logic device(s) (FPLD(s)), etc. When any of the appended apparatus or system claims of this patent are read to cover a purely software and/or firmware implementation at least one of the example starter manager 212, the example starter module 214, the example controller 222, the example data storage 216, the example operational status detector 220, the example timer 221, the example monitoring data collector 218, the example identity requestor 224, the example identity releaser 226, the example start instruction generator 228, and/or, more generally, the example remote starter 110, the example VM provisioning tool 108, the example DHCP server 234, the example virtual machines 112-118, and the example hypervisor 122 are hereby expressly defined to include a tangible computer readable medium such as a memory, digital versatile disk (DVD), compact disk (CD), etc., storing such software and/or firmware. Further still, the example system of FIG. 1 may include one or more elements, processes and/or devices in addition to, or instead of, those illustrated in FIG. 1 and FIG. 2, and/or may include more than one of any or all of the illustrated elements, processes and devices.

Figure 3:
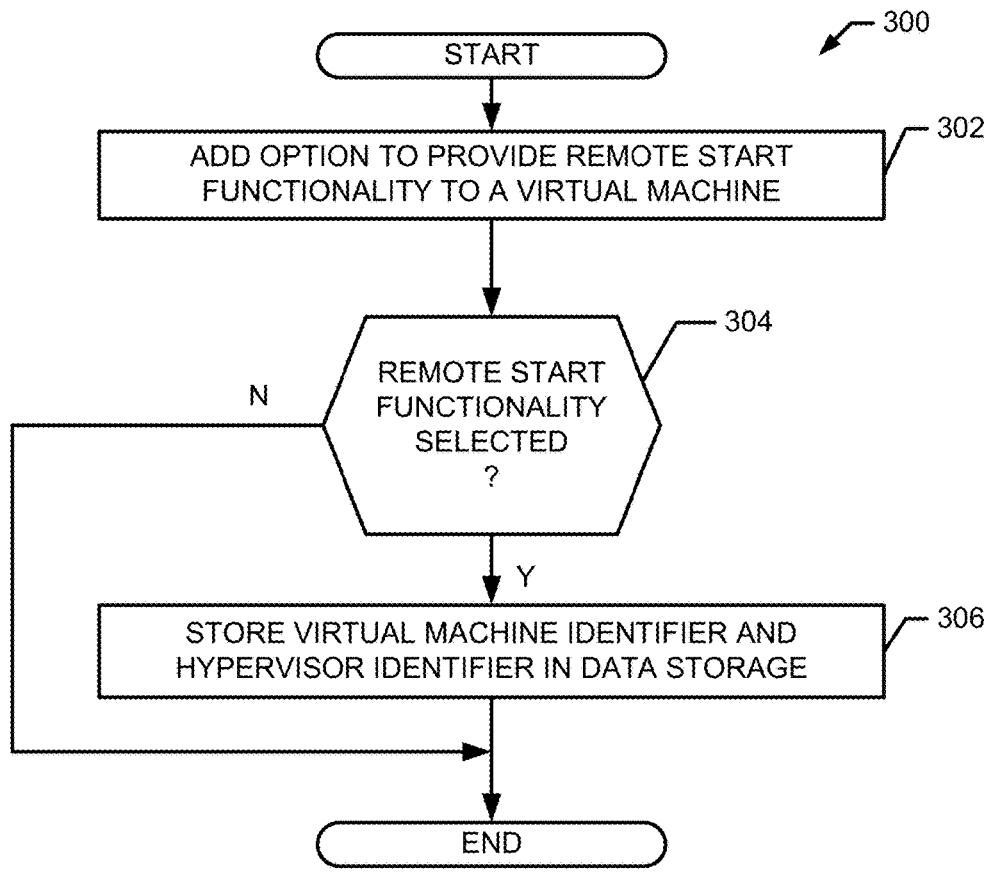
FIG. 3 is a flowchart representative of example computer readable instructions that can be executed to configure a virtual machine to include remote start functionality.
Figure 4A:
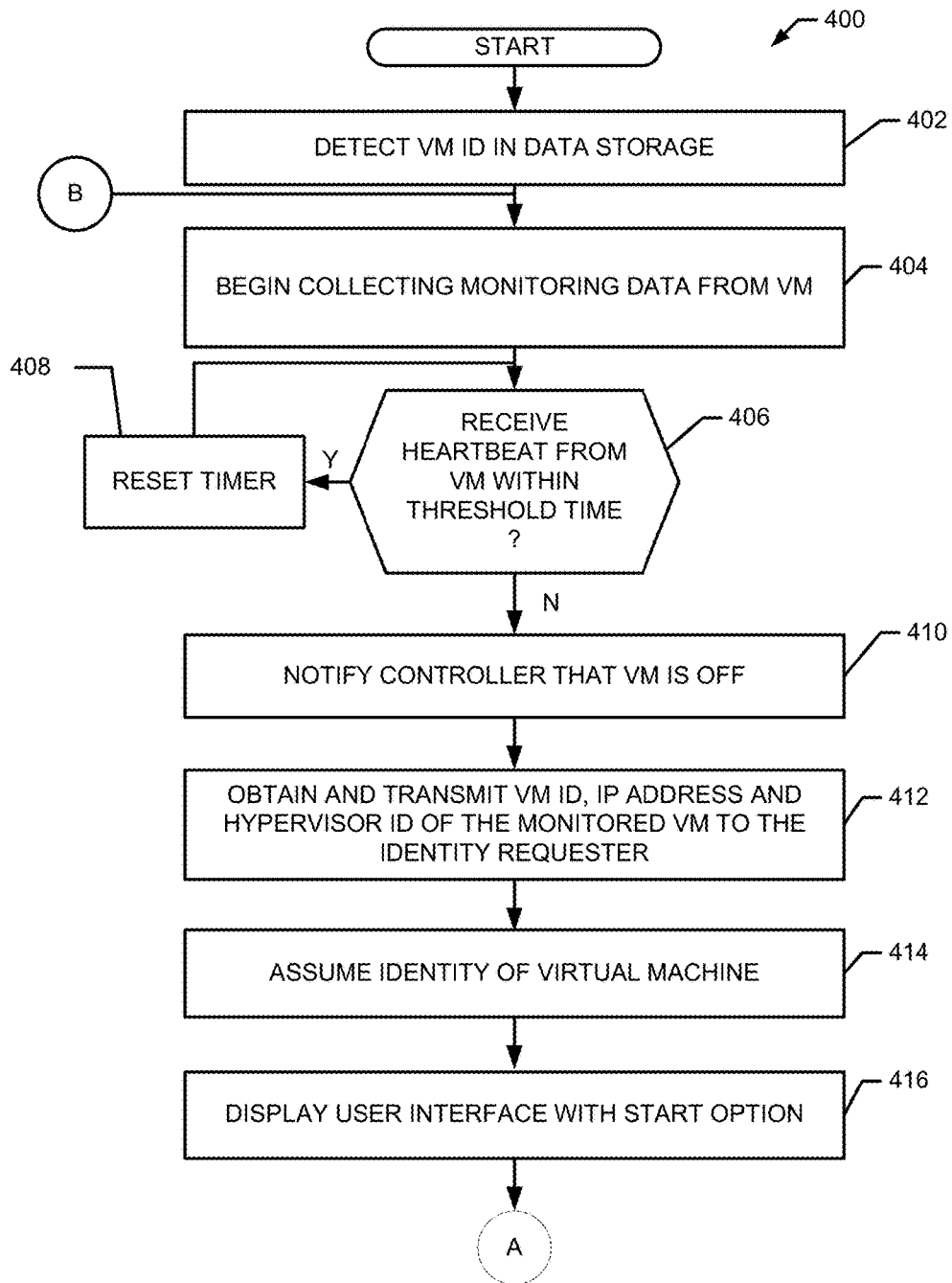
FIG. 4A and FIG. 4B illustrate a flowchart representative of example computer readable instructions that can be executed to remotely start a virtual machine.
Figure 4B:
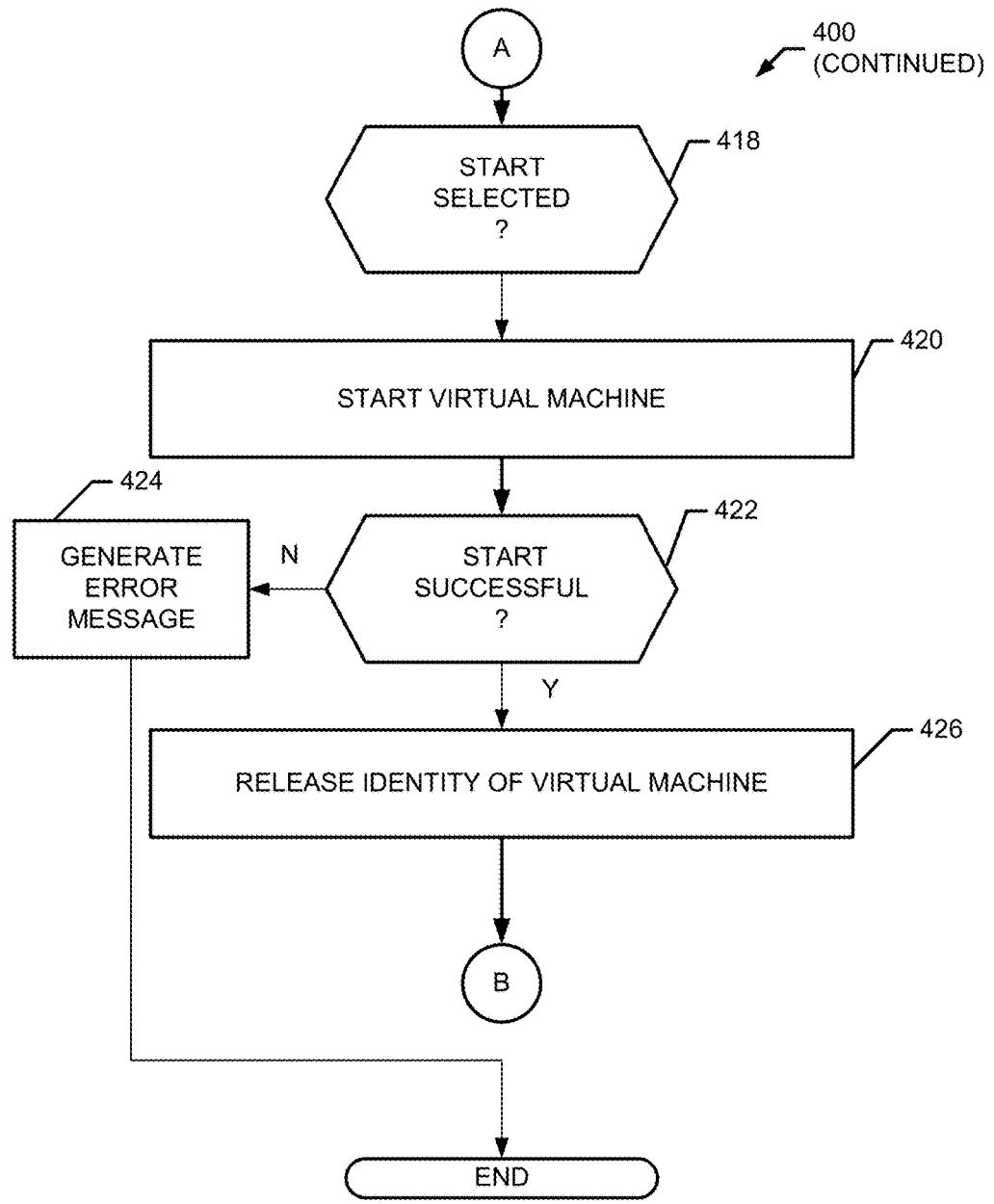

Flowcharts representative of example machine readable instructions for implementing the example VM provisioning tool 108 and the example remote starter 110 of FIG. 1 and/or FIG. 2 are shown in FIG. 3, FIG. 4A and FIG. 4B. In this example, the machine readable instructions comprise a program for execution by a processor such as the processor 512 shown in the example processor platform 500 discussed below in connection with FIG. 5. The program may be embodied in software stored on a tangible computer readable storage medium such as a CD-ROM, a floppy disk, a hard drive, a digital versatile disk (DVD), a Blu-ray disk, or a memory associated with the processor 512, but the entire program and/or parts thereof could alternatively be executed by a device other than the processor 512 and/or embodied in firmware or dedicated hardware. Further, although the example program is described with reference to the flowchart illustrated in FIG. 3, FIG. 4A and FIG. 4B, many other methods of implementing the example remote starter 110 may alternatively be used. For example, the order of execution of the blocks may be changed, and/or some of the blocks described may be changed, eliminated, or combined.

As mentioned above, the example processes of FIG. 3, FIG. 4A and FIG. 4B may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and transmission media. As used herein, "tangible computer readable storage medium" and "tangible machine readable storage medium" are used interchangeably. Additionally or alternatively, the example processes of FIG. 3, FIG. 4A and FIG. 4B may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and transmission media. As used herein, when the phrase "at least" is used as the transition term in a preamble of a claim, it is open-ended in the same manner as the term "comprising" is open ended.

Example machine readable instructions 300 that may be executed to implement the VM provisioning tool 108 of FIGS. 1-2 are illustrated by the flowchart shown in FIG. 3. The example machine readable instructions 300 may be executed periodically and/or aperiodically (e.g., at predetermined intervals, based on an occurrence of a predetermined event, etc., or any combination thereof). The machine readable instructions 300 begin execution at a block 302 of FIG. 3 at which an option to provide remote start functionality to a virtual machine is added to a set of configuration/provisioning options presented to a system administrator by the example VM provisioning tool 108 (see FIG. 2). Thus, a system administrator using the VM provisioning tool 108 to provision/configure a virtual machine can select the option to include the remote start functionality when configuring the virtual machine. If the remote start functionality is selected when provisioning, for example, the example first VM 112 (block 304), the VM provisioning tool 108 causes the virtual machine identifier of the first VM 112, VM ID1, and a hypervisor identifier ("hypervisor ID") that uniquely identifies the example hypervisor 122 associated with first VM 112 (e.g., the hypervisor 122 of FIG. 1), to be stored in the example data storage 216 (see FIG. 2) (block 306). In some examples, if an IP address is not yet associated with the first VM 112, the VM provisioning tool 108 can wait until a later time at which the IP address is assigned and then store the assigned IP address in the data storage 216 at (or after) the later time. Additionally or alternatively, the VM provisioning tool 108 can instruct the first VM 112 to notify the VM provisioning tool 108 when an IP address is assigned/allocated to the first VM 112. If, during the provisioning process, the option to add remote start functionality is not selected (block 304), the method of FIG. 3 ends.

Example machine readable instructions 400 that may be executed to implement the remote starter 110 of FIGS. 1-2 are represented by the flowchart shown in FIG. 4A and FIG. 4B. The example machine readable instructions 400 may be executed periodically and/or aperiodically (e.g., at predetermined intervals, based on an occurrence of a predetermined event, etc., or any combination thereof). The machine readable instructions 400 begin execution at block 402 of FIG. 4A at which the example controller 222 (see FIG. 2) of the example starter manager 212 (see FIG. 2) detects the presence of the example first virtual machine identifier, VM ID1, in the example data storage 216 (see FIG. 2) and causes the example monitoring data collector 218 (see FIG. 2) to begin monitoring the operational status of the example first VM 112 (see FIG. 1 and FIG. 2) (block 404). In some examples, the controller 222 causes the example monitoring data collector 218 to begin monitoring the status of the example first VM 112 by supplying the virtual machine identifier, VM ID1, and the IP address assigned to the first VM 112, IP address1, to the monitoring data collector 218. The monitoring data collector 218, in turn, uses the supplied information to seek monitoring data from the first VM 112. In some examples, the monitoring data is obtained from the example software implemented monitoring agent 232 (see FIG. 2) installed in the first VM 112 and/or installed in the example hypervisor 122 (see FIG. 2) corresponding to the first VM 112. In some examples, the starter manager 212 monitors multiple VMs. In some such examples, a VM ID, a hypervisor ID and an IP address corresponding to each virtual machine being monitored is stored in the data storage 216 by the example VM provisioning tool 108 (see FIG. 2) as described with respect to FIG. 3.

The example monitoring data collector 218 supplies the collected monitoring data to the example operational status detector 220 which uses the monitoring data to determine the operational status (e.g., whether the operational status detector 220 is responsive (ON) or non-responsive (OFF)) of the first VM 112 from which the monitoring data was collected (block 406). In the illustrated example, the monitoring data includes heartbeat data transmitted by the first VM 112 (using, for example, the example software agent 232) and the example operational status detector 220 determines whether a heartbeat signal has been received during an elapsed, threshold amount of time (block 406). Provided that such a heartbeat signal is received within the threshold amount of elapsed time as measured with the example timer 221 (see FIG. 2), the timer is reset (block 408). Control then returns to block 406 for the operational status detector 220 to await arrival of the next heartbeat signal.

If a heartbeat signal is not received from the example first VM 112 within a threshold amount of elapsed time (block 406), the example operational status detector 220 notifies the example controller 222 that the first VM 112 is non-responsive (e.g., is turned off or has stalled) (block 410). In some examples, the operational status detector 220 performs the notification by transmitting the virtual machine identifier (e.g., VM ID1) of the first VM 112 to the example controller 222. The controller 222 responds to the notification by obtaining the IP address (e.g., IP address 1), and the hypervisor ID corresponding to the first VM 112 and transmitting the virtual machine identifier (e.g., VM ID1), the IP address (e.g., IP address1) and the corresponding hypervisor ID to the example identity requestor (see FIG. 2) (block 412). The example identity requestor 224 responds to the information by assuming the identity of the first VM 112 (block 414). In some examples, the identity requestor 224 assumes the identity of the first VM 112 by requesting that the IP address formerly assigned to the first VM 112 (e.g., IP address1) be assigned/allocated to the example remote starter 110 (see FIG. 2). The request is transmitted to a network device (e.g., the DHCP server 234 of FIG. 2) responsible for assigning IP addresses to network elements. In some examples, when the request is granted, the DHCP server 234 transmits a confirmation message to the identity requestor 224.

In some examples, when the identity requestor 224 requests assignment of the IP address1, the request is denied via a denial message. This may occur when, for example, the first VM 112 and/or the associated guest operating system 120 installed in the first VM 112 become inoperable but fail to properly release the IP address1. When a denial message is received from the DHCP server 234, the example identity releaser 226 responds to the message by sending a release message to the DHCP server 234 instructing the DHCP server to release the IP address1. In some examples, the identity releaser 226 instead sends a message to the example hypervisor 122 instructing the hypervisor 122 to send a release message to the DHCP server 234. After the IP address1 is released, the identity requestor 224 again requests assignment of the IP address1 from the DHCP server 234. In some examples, the identity requestor 224 awaits a confirmation message from the DHCP server 234 indicating that the IP address1 was properly released before again making a request that the IP address be assigned/allocated to the example remote starter 110.

After the IP address formerly assigned to the example first VM 112 is reassigned/reallocated to the example remote starter 110, the example user interface generator 230 (see FIG. 2) causes a user interface, such as a web page, to be served at the IP address (block 416). Thus, when a user attempts to access the example first VM 112 via the example user terminal 124 (see FIG. 1), the user will be presented with the user interface served by the user interface generator 124. As described above, in some examples, the user interface indicates that the first VM 112 has been turned off and provides an option (or a menu of options) by which the user can elect to start the first VM 112. The user interface may additionally or alternatively: 1) require that the user enter authentication information such as a username and password, 2) provide options to send a message to virtual data center administrative personnel regarding the status of the first VM 112, 3) start the first VM 112 at a specified future time, 4) query the hypervisor 122 for information regarding whether the first VM 112 is turned off or whether the guest OS is turned off or stalled, etc.

Referring also to FIG. 4B on which the flowchart 400 continues from FIG. 4A at a connection point A, the example user interface generator 230 causes the user interface to continue to be displayed at the IP address1 until determining that a user has selected the option to start the example first VM 112 (block 418). When the example user interface generator 230 determines that a user has elected to start the first VM 112 by, for example, selecting a radial button on the user interface display, the example starter instruction generator 228 generates and transmits a start instruction to the hypervisor 122 associated with the first VM 112 (block 420). In some examples, the start instruction generator 228 obtains the hypervisor ID and/or an IP address of the example hypervisor 122 from the identity requestor 224. In some examples, the start instruction generator 228 accesses the example data storage 216 to obtain the IP address of the hypervisor 122.

Next, the example starter module 214 of FIG. 2 determines whether the start operation was successful (block 422). In some examples, the starter module 214 determines that the start operation was successful when a message is received from the example first VM 112 and/or the example hypervisor 122 indicating that the start was a success. In some examples, the starter module 214 determines that the start operation was successful based on a message received from the example operational status detector 220, the example monitoring data collector 218, and/or the example controller 222 indicating that a heartbeat signal has been received from the first VM 112. In some examples, when the starter module 214 determines that the start operation was not successful (block 422), the starter module 214 notifies the example user interface generator 230, which responds to the notification by generating a user interface display containing an error message (block 424).

When the example starter module 214 determines that the start operation was successful, the example identity releaser 226 releases the IP address (e.g., IP address1) of the example first VM 112 (block 426). In some examples, the identity releaser 226 releases the IP address (e.g., IP address1) by generating and transmitting an "address release" instruction to the example DHCP server 234. In some examples, upon releasing the IP address (e.g., IP address1), the starter module 214 notifies the example controller 222 which responds to the notification by causing the example monitoring data collector 218 and operational status detector 220 to resume monitoring the operational status of the virtual machine (block 404), as illustrated via the connection point B on FIG. 4A and FIG. 4B.

In some examples, a single example starter manager 212 monitors multiple virtual machines and manages the actuation of multiple example starter modules 214. In some such examples, each starter module 214 may be assigned to start a specific virtual machine and information identifying the starter module 214 assigned to a specific virtual machine can be stored in the data storage. When the example starter manager 212 determines that a virtual machine has turned off, the starter manager 212 accesses the data storage to identify the example starter module 214 assigned to start the virtual machine. In some examples, a single starter manager 212 monitors multiple virtual machines and a single starter module 214 can be used to start any of the monitored virtual machines that turn off. In some examples, the example controller 222, the example monitoring data collector 218, and the example operational status detector 220 resume monitoring of the virtual machine upon start of the virtual machine (without waiting until the IP address has been released). In some examples, the example controller 222, the example monitoring data collector 218, and the example operational status detector 220 continue to monitor a virtual machine after the virtual machine has turned off, thereby eliminating the need to resume monitoring operations after start of the virtual machine.

Figure 5:
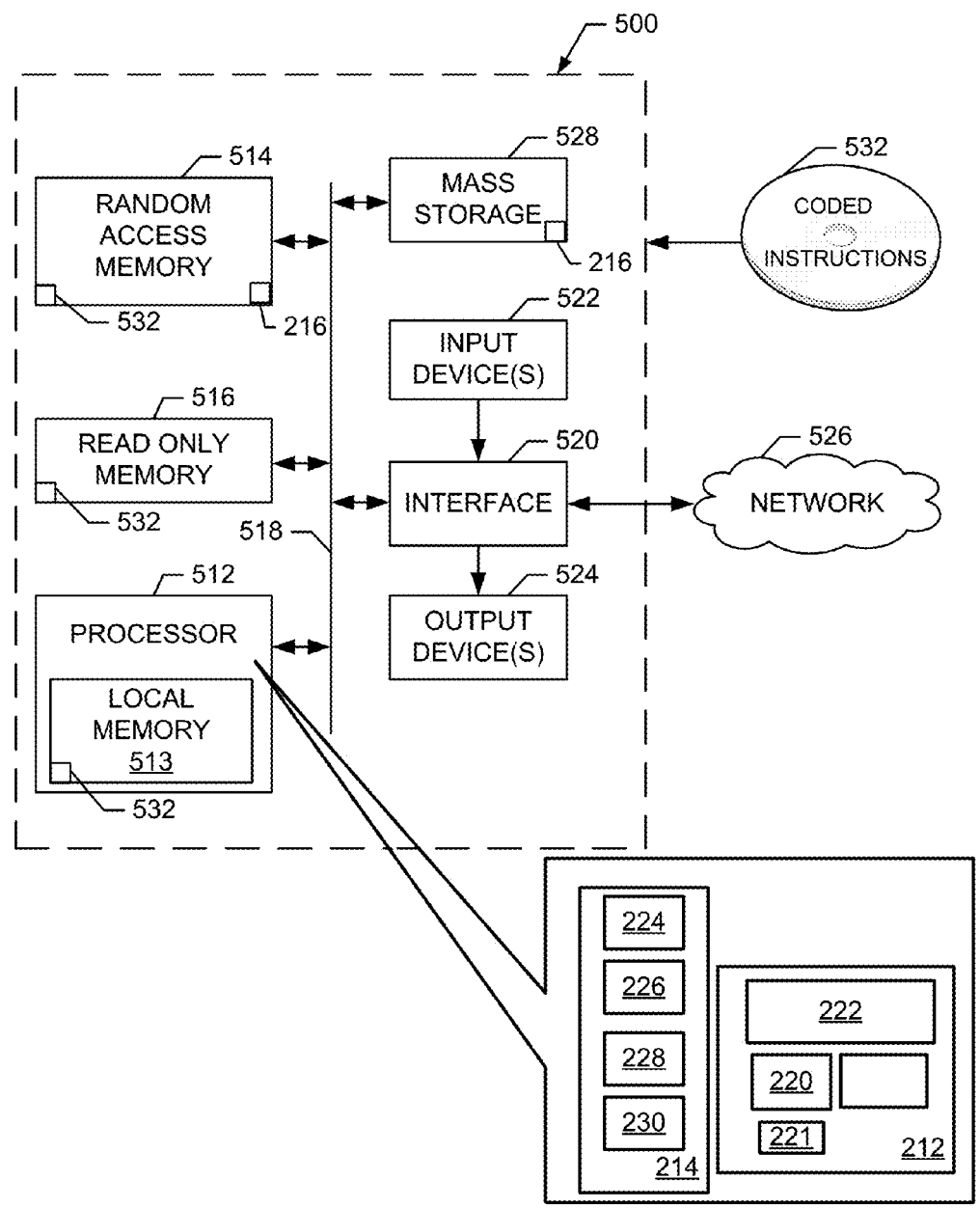
FIG. 5 is a block diagram of an example processing system that may execute example machine readable instructions of FIG. 3 and/or FIG. 4A and FIG. 4B to implement the example systems of FIG. 1 and/or FIG. 2.

FIG. 5 is a block diagram of an example processor platform 500 capable of executing the instructions of FIG. 3, FIG. 4A and FIG. 4B to implement the example remote starter 110, the example starter manager 212, the example starter module 214, the example controller 222, the example monitoring data collector 218, the example operational status detector 220, the example timer 221, the example identity requestor 224, the example identity releaser 226, the example start instruction generator 228, and/or the example user interface generator 230 of FIGS. 1 and 2. The processor platform 500 can be, for example, a server, a personal computer, an Internet appliance, or any other type of computing device.

The processor platform 500 of the illustrated example includes a processor 512. The processor 512 of the illustrated example is hardware. For example, the processor 512 can be implemented by one or more integrated circuits, logic circuits, microprocessors or controllers from any desired family or manufacturer.

The processor 512 of the illustrated example includes a local memory 513 (e.g., a cache). The processor 512 of the illustrated example is in communication with a main memory including a volatile memory 514 and a non-volatile memory 516 via a bus 518. The volatile memory 514 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 516 may be implemented by flash memory and/or any other desired type of memory device. Access to the main memory 514, 516 is controlled by a memory controller. Any of the random access memory device 514 and the mass storage 528 can be used to implement the data storage 216 of FIG. 2.

The processor platform 500 of the illustrated example also includes an interface circuit 520. The interface circuit 520 may be implemented by any type of interface standard, such as an Ethernet interface, a universal serial bus (USB), and/or a PCI express interface.

In the illustrated example, one or more input devices 522 are connected to the interface circuit 520. The input device(s) 522 permit(s) a user to enter data and commands into the processor 512. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 524 are also connected to the interface circuit 520 of the illustrated example. The output devices 524 can be implemented, for example, by display devices (e.g., a light emitting diode (LED), an organic light emitting diode (OLED), a liquid crystal display, a cathode ray tube display (CRT), a touchscreen, a tactile output device, a light emitting diode (LED), a printer and/or speakers). The interface circuit 520 of the illustrated example, thus, typically includes a graphics driver card, a graphics driver chip or a graphics driver processor.

The interface circuit 520 of the illustrated example also includes a communication device such as a transmitter, a receiver, a transceiver, a modem and/or network interface card to facilitate exchange of data with external machines (e.g., computing devices of any kind) via a network 526 (e.g., an Ethernet connection, a digital subscriber line (DSL), a telephone line, coaxial cable, a cellular telephone system, etc.).

The processor platform 500 of the illustrated example also includes one or more mass storage devices 528 for storing software and/or data. Examples of such mass storage devices 528 include floppy disk drives, hard drive disks, compact disk drives, Blu-ray disk drives, RAID systems, and digital versatile disk (DVD) drives. In some examples, the mass storage 528 can be used to implement the data storage 216 of FIG. 2.

The coded instructions 532 of FIG. 3, FIG. 4A and FIG. 4B may be stored in the mass storage device 528, in the volatile memory 514, in the non-volatile memory 516, and/or on a removable tangible computer readable storage medium such as a CD or DVD.

As described above, in some examples, all (or portions of) the example remote starter 110 (see FIG. 1) is implemented on a virtual machine coupled to the network 106 (see FIG. 1). In some examples, all (or portions of) the remote starter 110 can be implemented on any type of device coupled to the network 106 (e.g., any network device) having the remote starter 110 functionality described with reference to FIG. 1 and FIG. 2.

This specification refers throughout to computational and network environments that include virtual machines (VMs). However, virtual machines are merely one example of data compute nodes (DNCs) or data compute end nodes, also referred to as addressable nodes. DCNs may include non-virtualized physical hosts, virtual machines, containers that run on top of a host operating system without the need for a hypervisor or separate operating system, and hypervisor kernel network interface modules.

VMs, in some embodiments, operate with their own guest operating systems on a host using resources of the host virtualized by virtualization software (e.g., a hypervisor, virtual machine monitor, etc.). The tenant (i.e., the owner of the VM) can choose which applications to operate on top of the guest operating system. Some containers, on the other hand, are constructs that run on top of a host operating system without the need for a hypervisor or separate guest operating system. In some embodiments, the host operating system uses name spaces to isolate the containers from each other and therefore provides operating-system level segregation of the different groups of applications that operate within different containers. This segregation is akin to the VM segregation that is offered in hypervisor-virtualized environments that virtualize system hardware, and thus can be viewed as a form of virtualization that isolates different groups of applications that operate in different containers. Such containers are more lightweight than VMs.

Hypervisor kernel network interface modules, in some embodiments, is a non-VM DCN that includes a network stack with a hypervisor kernel network interface and receive/transmit threads. One example of a hypervisor kernel network interface module is the vmknic module that is part of the ESXi™ hypervisor of VMware, Inc.

It should be recognized that while the specification refers to VMs, the examples given could be any type of DCNs, including physical hosts, VMs, non-VM containers, and hypervisor kernel network interface modules. In fact, the example networks could include combinations of different types of DCNs in some embodiments.

From the foregoing, it will be appreciated that the above disclosed methods, systems, apparatus and articles of manufacture give a user the ability to remotely start a virtual machine such that a user no longer needs to contact a system administrator or wait for a predetermined amount of time to elapse before the virtual machine is automatically started. As a result, wasted downtime (which is a natural consequence of having to wait for the assistance of a system administrator or for a timeout period to expire) is eliminated. In addition, the remote starter gives the user greater control over processor resources. For example, a user having the ability to remotely start the virtual machine at-will can decide to intentionally shut down the virtual machine as needed to preserve processing resources. In contrast, users of systems that do not offer remote start capability are unlikely to intentionally shut off a virtual machine for any reason because they lack control over when the virtual machine is started again. Thus, the remote starter disclosed herein offers both greater control over resource consumption and an ability to eliminate or minimize downtime.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A method to restart a virtual machine, the method comprising:

in response to determining, at a network device of a virtual data center manager, that a heartbeat of the virtual machine has stopped, transmitting a request from the network device of the virtual data center manager to a dynamic host configuration protocol (DHCP) server to allocate a network address to the network device, the network address having been the last network address to be allocated to the virtual machine before the heartbeat of the virtual machine stopped;

in response to the network address being allocated to the network device, generating, with the network device, a user interface for display at a user terminal remote from the virtual data center manager, the user interface presenting an option to restart at least one of the virtual machine and an operating system installed in the virtual machine, the option to restart being selectable by a user, the user not having network administrator privileges to restart the virtual machine;

transmitting a request from the network device to the DHCP server to release the network address from allocation to the network device based on a selection of the option to restart the virtual machine via the user interface, the release of the network address from allocation to the network device to cause the network address to be available for re-allocation to the virtual machine; and instructing, by the network device, the virtual machine to request the DHCP server to allocate the same network address to the virtual machine upon restart of the virtual machine based on the selection of the option.

2. The method defined in claim 1, further including generating an instruction to restart the virtual machine in response to the option to restart the virtual machine being selected, the release of the network address being requested before the virtual machine is restarted.

3. The method defined in claim 1, further including determining, at the network device, whether the heartbeat of the virtual machine has stopped.

4. The method defined in claim 3, further including:
when the heartbeat of the virtual machine is determined to have stopped, determining whether the network address is still allocated to the virtual machine; and
if the network address is still allocated to the virtual machine, causing the network address to be released from allocation to the virtual machine.

5. The method defined in claim 3, further including:
identifying a starter module assigned to restart the virtual machine; and
notifying the starter module when the heartbeat of the virtual machine is determined to have stopped.

6. The method defined in claim 2, wherein the generating of the instruction to restart the virtual machine in response to the option to restart the virtual machine being selected includes sending an instruction to a hypervisor associated with the virtual machine, the hypervisor to respond to the instruction by restarting the virtual machine.

7. A tangible machine readable storage medium comprising instructions which, when executed by a virtual machine starter of a network device of a virtual data center manager, cause the virtual machine starter to at least:

in response to determining that a heartbeat of a virtual machine has stopped, request a network address be assigned by a dynamic host configuration protocol (DHCP) server to the virtual machine starter, the network address being the last network address assigned to the virtual machine before the heartbeat of the virtual machine stopped;

in response to the network address being assigned to the virtual machine starter, generate a user interface for display at a user terminal remote from the virtual machine starter, the user interface to present an option to restart the virtual machine, the option to restart being selectable by a user not having network administrator privileges to restart the virtual machine;

request the network address be released by the DHCP server from assignment to the virtual machine starter based on a selection of the option to restart the virtual machine via the user interface; and instruct the virtual machine to request assignment of the same network address from the DHCP server to the virtual machine upon restart of the virtual machine based on the selection of the option.

8. The tangible machine readable storage medium defined in claim 7, wherein the instructions, when executed, further cause the virtual machine starter to restart the virtual machine in response to selection of the option to restart the virtual machine.

9. The tangible machine readable storage medium defined in claim 8, wherein the instruction to restart the virtual machine includes an instruction to reboot a guest operating system installed in the virtual machine.

10. The tangible machine readable storage medium defined in claim 7, wherein the instructions, when executed, further cause the virtual machine starter to determine whether the heartbeat of the virtual machine has stopped.

11. The tangible machine readable storage medium defined in claim 10, wherein the instructions, when executed, further cause the virtual machine starter to:
when the heartbeat of the virtual machine is determined to have stopped, determine whether the network address is still allocated to the virtual machine.

12. A network device of a virtual data center manager, the network device comprising:
an identity requestor to, in response to determining that a heartbeat of a virtual machine has stopped, request an Internet Protocol (IP) address be assigned from a dynamic host configuration protocol (DHCP) server to the network device, the IP address being the last IP address assigned to the virtual machine before the heartbeat of the virtual machine stopped;
a user interface generator to generate a user interface in response to the IP address being assigned to the network device, the user interface to present an option to restart the virtual machine at a user terminal remote from the virtual data center, the option to restart being selectable by a user who does not have network administrator privileges to restart the virtual machine; and
an identity releaser to request the DHCP server to release the IP address in response to selection of the option to restart the virtual machine via the user interface, the identity releaser to instruct the virtual machine to request assignment of the same IP address from the DHCP server to the virtual machine upon restart of the virtual machine based on the selection of the option.

13. The network device defined in claim 12, wherein the identity releaser is further to release the IP address from assignment to the virtual machine, in response to the DHCP server denying the request to assign the IP address.

14. The network device defined in claim 12, further including a starter module, the starter module to cause the virtual machine to restart based on selection of the option to restart the virtual machine.

15. The network device defined in claim 14, wherein the starter module is to generate a restart instruction to a hypervisor associated with the virtual machine.

16. The network device defined in claim 12, further including a monitor to determine whether the heartbeat of the virtual machine has stopped.

17. The network device defined in claim 16, wherein the virtual machine is a first virtual machine of a plurality of virtual machines, the IP address is a first IP address of a plurality of IP addresses, and the monitor is to monitor heartbeats of the plurality of virtual machines, the network device further including:
   a starter manager to transmit information identifying the first IP address to the identity requestor in response to a determination by the monitor that the heartbeat of the first virtual machine has stopped.

18. The network device defined in claim 17, wherein the virtual machines are assigned respective IP addresses, the network device further including:
   a data storage to store information to identify the virtual machines and their respective IP addresses, the starter manager to access the data storage to identify a corresponding one of the IP addresses assigned to one of the plurality of virtual machines that the monitor has determined has a heartbeat that has stopped.

* * * * *